Feb. 28, 1956     H. SCHLUMPF     2,736,234

PHOTOGRAPHIC OBJECTIVE OF THREE AIR SPACED LENSES

Filed May 21, 1951

INVENTOR.
HANS SCHLUMPF
BY
ATTORNEY

United States Patent Office 2,736,234
Patented Feb. 28, 1956

2,736,234
PHOTOGRAPHIC OBJECTIVE OF THREE AIR SPACED LENSES
Hans Schlumpf, Aarau, Switzerland
Application May 21, 1951, Serial No. 227,315
3 Claims. (Cl. 88—57)

This invention relates to photographic objectives, more particularly to objectives with three lenses separated by air spaces, the anterior lens component being collecting, the intermediate component being dispersing, and the posterior component being collecting.

Objectives of the general type, above referred to, which are frequently used for taking portraits, have the disadvantage that the spherical zone error is comparatively large. A correction of this error was hitherto only possible by accepting an increase of the other errors of the objective.

The principal object of the present invention is to provide means by which the spherical zone error of objectives of the general type, above referred to, can be appreciably reduced without an increase of the other errors of the objective.

According to a now preferred embodiment of the invention, the aforementioned object and other objects which will be pointed out hereinafter, are attained by employing a dispersing lens component which has an apex thickness between 15 and 30 per cent of the focal distance of the objective and by providing a specific relationship between the radii of certain surfaces of the lens components.

In the accompanying drawing a now preferred embodiment of the invention is shown by way of illustration and not by way of limitation.

Figure 1:
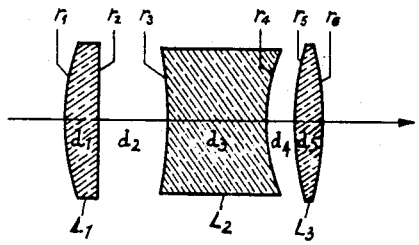
Fig. 1 is a photographic objective according to the invention.

Referring now to the figures in detail, the objective according to Fig. 1 comprises an anterior collecting lens $L_1$, an intermediate dispersing lens $L_2$, and a posterior collecting lens $L_3$. The dispersing lens $L_2$ is preferably made of flint glass.

Figure 2:
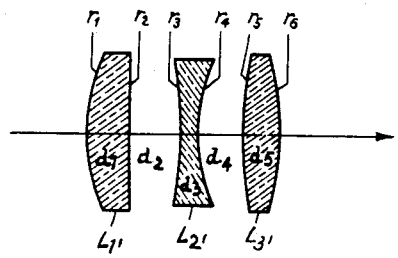
Fig. 2 is a similar view of a conventional objective shown for the purpose of comparison.

Similarly, the objective according to Fig. 2 comprises an anterior collecting lens $L_1'$, an intermediate dispersing lens $L_2'$, and a posterior collecting lens $L_3'$.

The subsequent Tables I and II tabulate the essential data of the two objectives, Table I pertaining to Fig. 1 and Table II to Fig. 2. The objectives are assumed to have a focal distance $f=100$. In the tables $r$ designates the radii of the lens components; and $n_d$ the index of refractions for the $d$ line of the spectrum; and $\nu$ the Abbe number Table I

[$f=100.0$   $S_{v'}=70.09$   1:2.8]

| $r$ | $d$ | $n_d$ | $\nu$ |
|---|---|---|---|
| $r_1=+44.37$ | $d_1=6.42$ | $L_1=1.607$ | $L_1=59.5$ |
| $r_2=\infty$ | $d_2=13.11$ |  |  |
| $r_3=-75.08$ | $d_3=19.11$ | $L_2=1.648$ | $L_2=33.8$ |
| $r_4=+36.18$ | $d_4=5.19$ |  |  |
| $r_5=+54.61$ | $d_5=5.46$ | $L_3=1.615$ | $L_3=55.5$ |
| $r_6=-60.24$ |  |  |  |

Table II

[$f=100.0$   $S_{v'}=78.26$   1:2.8]

| $r$ | $d$ | $n_d$ | $\nu$ |
|---|---|---|---|
| $r_1=+35.60$ | $d_1=8.33$ | $L_1=1.612$ | $L_1=55.4$ |
| $r_2=+322.26$ | $d_2=9.85$ |  |  |
| $r_3=-76.45$ | $d_3=3.33$ | $L_2=1.648$ | $L_2=33.8$ |
| $r_4=+33.43$ | $d_4=8.88$ |  |  |
| $r_5=+75.27$ | $d_5=7.22$ | $L_3=1.612$ | $L_3=55.4$ |
| $r_6=-53.90$ |  |  |  |

As Table I shows, the apex thickness of the dispersing lens component $L_2$ has a value of 19.11 which is greater than 15 per cent. of the focal distance of the objective according to Table I. Table II which pertains to the conventional objective, has a dispersing lens component $L_2'$, the apex thickness of which is given as 3.33 and hence considerably smaller than 15 per cent. of the focal distance of the objective.

The aforementioned apex thickness between a minimum of 15% and a maximum of 30% makes it possible to provide a specific relationship between the radii of certain surfaces of the lens components which relationship results in a reduction of the spherical zone error or in other words in an increase of the effective relative aperture of the objective. More specifically, a definite relationship between the values of radii $r_3$, $r_4$, and $r_5$ must be selected. As will appear from Table I, the ratio $r_4/r_5$ is comparatively large, to wit, between 0.5 and 1.0 and $r_3$ is greater than $r_5$ so that the selected relationship can be expressed by $r_3 > r_5 > r_4 > 0.5 r_5$.

It has been found that the spherical zone error can be even further reduced by selecting for the anterior collecting component a smaller index of refraction than for the posterior collecting component. In other words, it is desirable that the anterior component has a comparatively small and the posterior component a comparatively large index of refraction.

Photographic objectives according to the invention are particularly suitable for objectives which are spherically, astigmatically, and comatically corrected for one or more colors.

Figure 3:
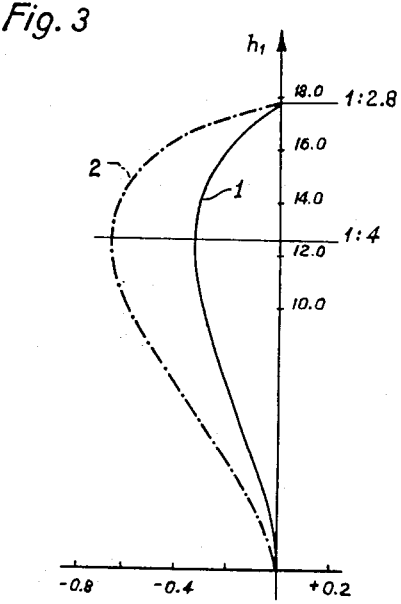
Fig. 3 is a graph showing the spherical aberrations of the two objectives.

In the graph according to Fig. 3 the full line 1 shows the spherical aberration of the objective according to Fig. 1 calculated on the basis of the data given in Table I, and the dashed-dotted line 2 shows the comparative spherical aberration of the conventional objective according to Fig. 2.

Mathematical analysis demonstrates that the objective according to Fig. 2 is not inferior as to chromatic, astigmatic, and comatic correction to the conventional objective according to Fig. 2.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A photographic objective having a focal length $f=100$ comprising an anterior collecting component, an intermediate dispersing component, and a posterior collecting component separated by air spaces one from another, the apex thickness of the dispersing component being between 15 and 30 percent of the focal length of the objective, and the radii of the surfaces of said components having the relationship $r_1=+44.37$; $r_2=\infty$; $r_3=-75.08$; $r_4=+36.18$; $r_5=+54.61$ and $r_6=-60.24$; wherein, as seen in the direction of the incident light, $r_1$ is a radius of the anterior surface of the anterior collecting component, $r_2$ is the radius of the posterior surface of the anterior collecting component, $r_3$ is the radius of the anterior surface of the dispersing component, $r_4$ is the radius of the posterior surface of the dispersing component, $r_5$ is the radius of the anterior surface of the posterior collecting component and $r_6$ is the radius of the posterior surface of the posterior collecting component.

2. A photographic objective having a focal length $f=100$ comprising an anterior collecting component, an intermediate dispersing component, and a posterior collecting component separated one from another by air spaces, the index of refraction of the anterior collecting component being smaller than the index of refraction of the posterior collecting component, the apex thickness of the dispersing component being between 15 and 30 percent of the focal length of the objective, and the radii of the surfaces of said components having the relationship $r_1=+44.37$; $r_2=\infty$; $r_3=-75.08$; $r_4=+36.18$; $r_5=+54.61$ and $r_6=-60.24$; wherein, as seen in the direction of the incident light, $r_1$ is a radius of the anterior surface of the anterior collecting component, $r_2$ is the radius of the posterior surface of the anterior collecting component, $r_3$ is the radius of the anterior surface of the dispersing component, $r_4$ is the radius of the posterior surface of the dispersing component, $r_5$ is the radius of the anterior surface of the posterior collecting component and $r_6$ is the radius of the posterior surface of the posterior collecting component.

3. A photographic objective according to claim 1, wherein the dispersing component is made of flint glass.

References Cited in the file of this patent

UNITED STATES PATENTS

| | | |
|---|---|---|
| 1,892,162 | Richter | Dec. 27, 1932 |
| 2,298,090 | Warmisham | Oct. 6, 1942 |
| 2,391,114 | Aklin | Dec. 18, 1945 |

FOREIGN PATENTS

| | | |
|---|---|---|
| 481,561 | Germany | Aug. 24, 1929 |
| 601,649 | Great Britain | May 10, 1948 |